Feb. 18, 1964  H. R. WARSEWA ETAL  3,121,350
CUTTING TOOL HOLDER
Filed July 24, 1961  3 Sheets-Sheet 1
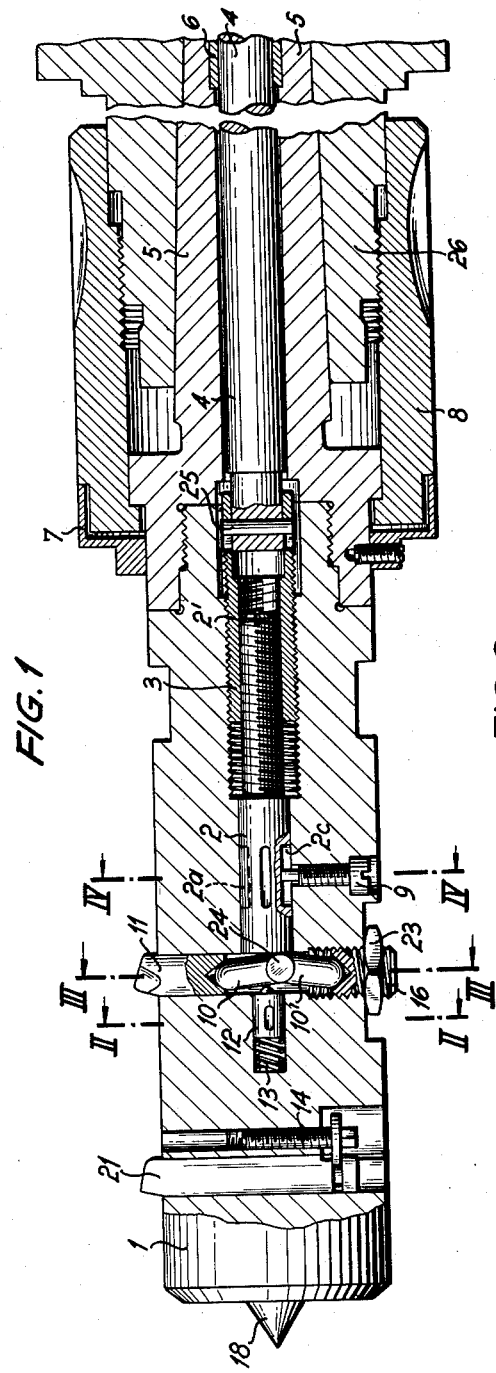
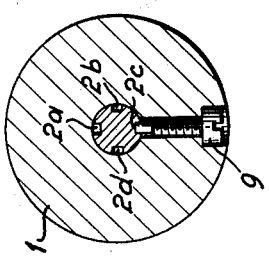
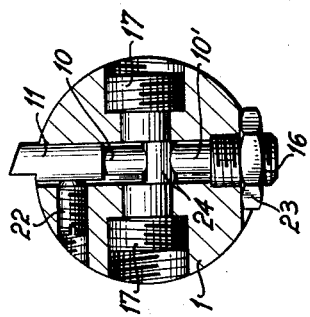
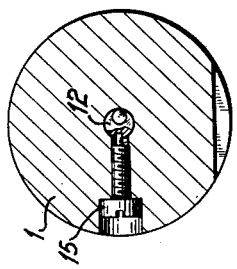
INVENTOR
Hans Robert Warsewa
Karl-Heinz Wolfram
By

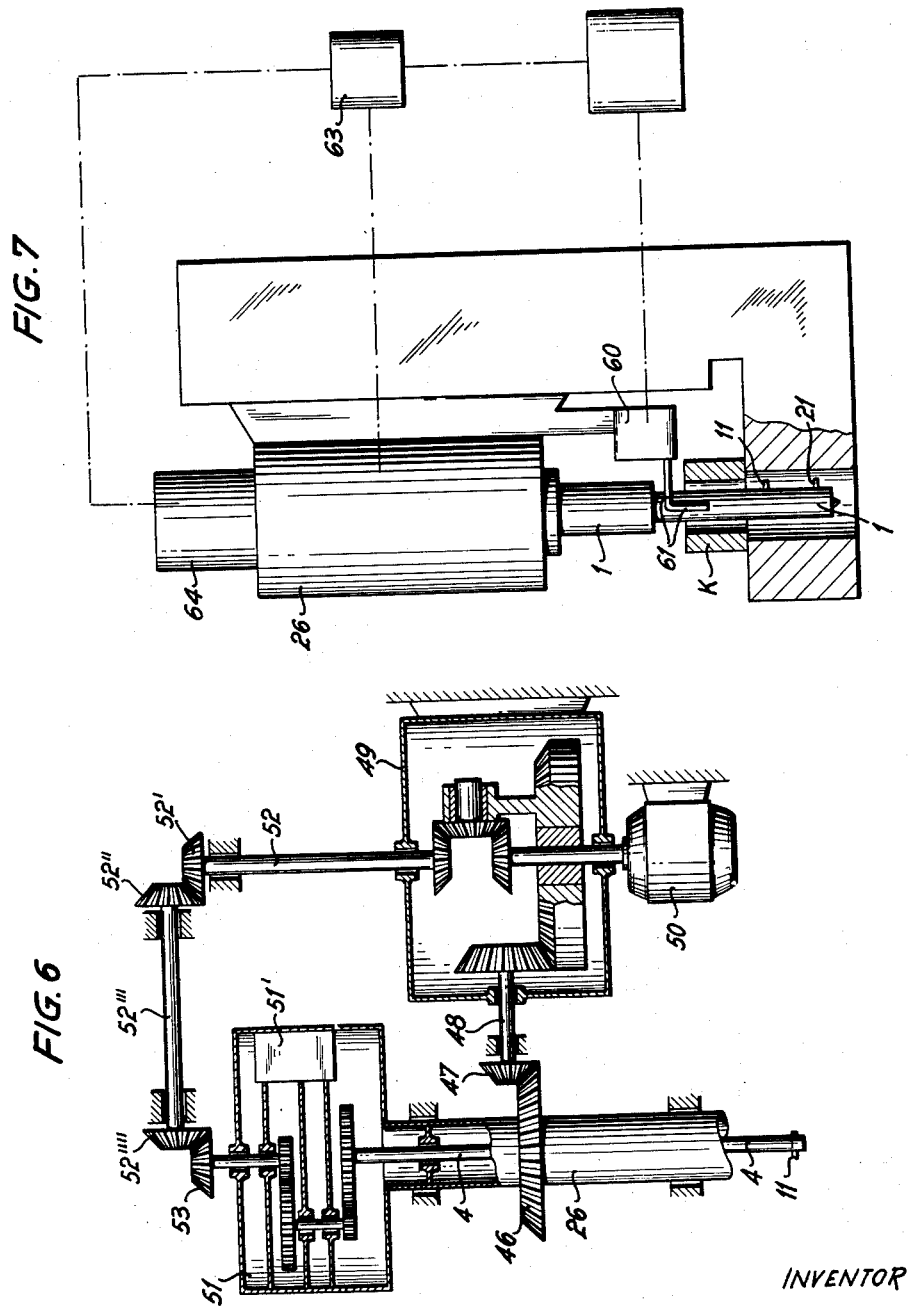

United States Patent Office 3,121,350
Patented Feb. 18, 1964

3,121,350
CUTTING TOOL HOLDER
Hans Robert Warsewa, Hofener Strasse 52, Stuttgart-Bad Cannstatt, Germany, and Karl-Heinz Wolfram, Christofstrasse 54, Fellbach, Wurttemberg, Germany
Filed July 24, 1961, Ser. No. 126,302
Claims priority, application Germany July 27, 1960
14 Claims. (Cl. 77—57)

The present invention comprises improvements in or relating to cutting-tool holders, particularly for boring purposes in machine tools. Known means of adjustment for cutting-tools in such holders are frequently crude and do not permit of sufficiently fine adjustment for accurate work. Moreover it would be an advantage with boring tools if they could be adjusted while rotating and even, for the purpose of compensating for wear of the cutter, while actually operating in a long cut such as a deep hole.

In known feeding devices the accurate adjustment of tools, particularly of boring bits, for precision turning and precision boring causes considerably increased difficulties because the machining limits obtained by such known methods have never been considerably reduced up to now ever since the initial application of such machining methods. In comparison, the present invention permits a much more sensitive adjustment and feed of the tool, which in turn permits considerably further reduced limits and tolerances.

According to the present invention a cutting tool holder comprises in combination, a body, a bit-holder aperture in the body, means for clamping a tool bit therein so that it projects from the body, a pair of toggle members hinged together and located in said bit-holder aperture, one of which toggle members is positioned to engage the tool-bit, the said aperture containing a seating for the other toggle member, and means to adjust the toggle to advance the tool-bit.

The body of the holder may be formed, for example as a boring bar and the bit-holder aperture is transverse to the length of the bar.

It is an object of the present invention to provide a feeding device which is simple in design, rigid and free of play, in which the toggle lever is used for precision adjustment of the cutting tool, preferably a boring bit, and in which above all the distance travelled by the toggle lever prior to attaining its fully extended position is used to actuate the feed of the tool directly.

The effect of employing a toggle in conjunction with means for clamping the tool-bit, is that enough force can be brought to bear on the tool to effect an adjusting movement thereof, without unclamping the tool-bit, so that adjustment can be effected even during the course of a cut. Therefore in deep holes, where tool wear may occur in the course of a single traverse of the tool, adjustment can be effected and the hole kept of full size throughout.

It can therefore be seen that it is of decisive importance that, as opposed to all known types of such feeding devices for tools, particularly boring bits, the clamping effect on the tool is maintained not only while the tool is at work but also during the precision adjustment or feeding motion of the said tool; that is, from the initial setting of the newly sharpened tool bit up to the end of its machining life.

The toggle lever is positioned between the component to be fed, for example on a boring bar between the boring bit which is to be precision-fed and the thrust bearing which takes up the counter forces, for example a set screw or the like adjustable in the direction of feed and lockable by a counter nut, in such a manner that the end of the toggle lever arms are supported in suitably designed bearings at their respective end.

A further object of the invention is to provide that the toggle lever aforesaid is characterized by a variable reduction ratio within its range of adjustment extending from an acutely angled position up to an almost fully extended position. In the fully extended position the reduction is infinite and decreases as the angle between the toggle lever arms decreases below 180°. The forces acting on the toggle lever in the feeding and operating direction and thereby the respective distances travelled by the various components are either reduced or increased, neglecting frictional forces which are not considered here. This is particularly effective during the transmission of the feeding forces acting on the part to be fed, because when suitably reduced this force will also act on the transmitting components at a similar reduction. This in turn means that the elastic deformation of the toggle lever and the respective force-transmitting components are held to extremely small limits. To permit the selection of the most advantageous reduction ratio for the shortest feeding motion during precision adjustment of the boring bit, another feature of the present invention consists of means assisting in the selection of a proper adjusting range of the toggle lever, for example, in the shape of axial slots located on the circumference of the screw or spindle which actuates the toggle lever to move in the forward direction, using positioning lugs or the like for this purpose. Such an arrangement permits manufacturing the screw threads and all the other threads of the various force-transmitting components of the feeding device without excessive precision. It is, of course, also possible to use only one of the said axial grooves and to adjust the reduction ratio by grinding the required material off the screw end resting against the central joint of the toggle lever in order to obtain the required starting or contact position of the toggle lever against the said central joint.

The invention furthermore includes certain constructions whereby adjustment of the cutting tool can be effected automatically or by power means during running of the machine-tool in which the cutting tool is operating, as will more fully hereinafter appear.

Certain embodiments of the invention are shown by way of example in the accompanying drawings, in which:

FIGURE 1 is a longitudinal section of a boring bar with adjustable tool-bit,

FIGURE 2 is a cross section on the line II—II of FIGURE 1,

FIGURE 3 is a cross section on the line III—III,

FIGURE 4 is a cross section on the line IV—IV of FIGURE 1,

FIGURE 6 is another embodiment of adjusting mechanism, and

Figure 5:
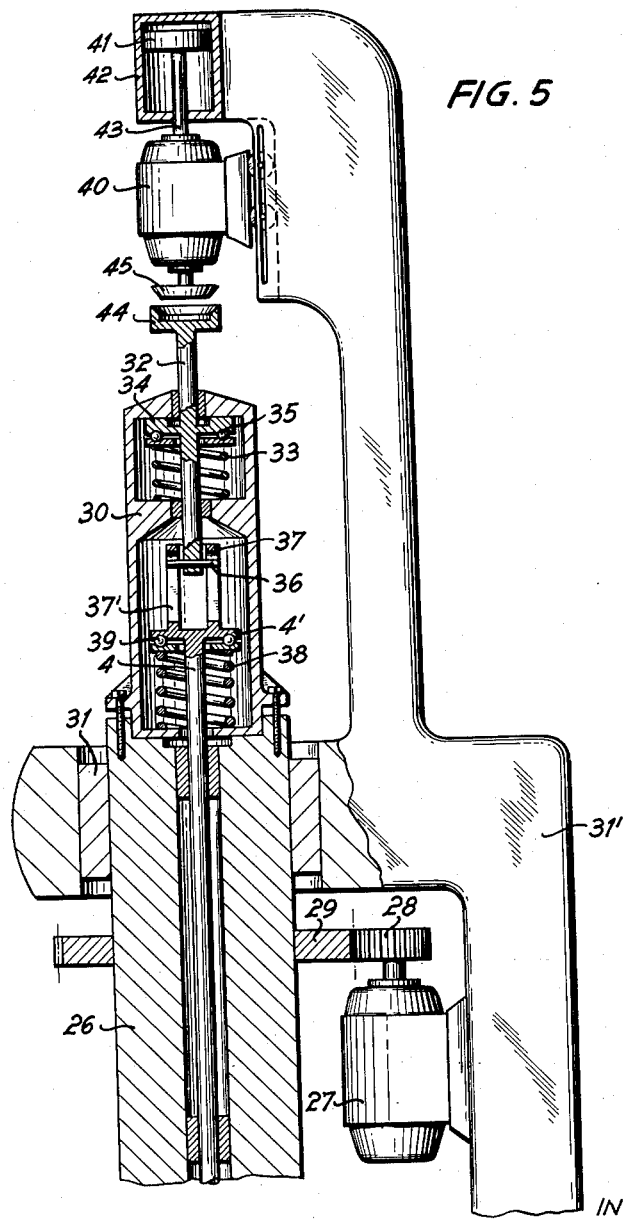
FIGURE 5 shows a mechanism for radial adjustment of the tool-bit.

FIGURE 7 an operational diagram for one type of control circuit for automatic adjustment of tool-bits.

Referring to FIGURES 1 to 4 a boring bit 11 is shown in a boring bar 1, located in a transverse bit-holder aperture which extends through the bar. The feeding device according to the present invention is shown in a position which enables adjustment of the bit 1 to a larger diameter to be effected. For this purpose toggle levers 10, 10' are provided which are located in the same aperture as the boring bit 11 and are provided with a central hinge joint member 24, having the shape of a cylindrical roller. The bearing surfaces in levers 10, 10' are of cylindrical shape to fit roller 24. The toggle lever arm 10 bears directly against a V-seating on the rear-end of boring bit 11 and the free end of arm 10' abuts against a hollow conical seating in a screw 16 provided to permit coarse adjustment of the boring bit. Coarse adjustment screw 16 may be locked by means of lock nut 23. The bearing surfaces of the outer ends of the toggle levers 10 and 10', upon the boring bit 11 and the set screw 16, are of hemispherical shape. In the direction of the axis of the boring bar 1 an adjusting rod 2 is supported for axial adjustment by means of a differential screw 3. The screw 3 has an external thread which fits a thread in the boring bar 1 and an internal thread of differential pitch which fits a screw thread on the exterior of adjusting rod 2. By "differential pitch" is meant either a pitch of the same or opposite hand to that in the bar 1 and such that rotation of the screw 3 will advance the bar 2 at a different rate from that due to either thread alone, usually at a slower rate. During forward feed in the direction of joint 24 of the toggle lever feed rod 2 exerts pressure against the central joint 24 of the toggle and moves the toggle lever which is in a spread position into a less spread position, in the course of which movement the free toggle lever arm 10 will move radially outward and will thereby move the boring bit 11.

Rotation of differential screw 3 is effected by means of a spindle 4. This rotation of spindle 4 may be effected automatically if desired as hereinafter described. Spindle 4 and differential screw 3 are connected by means of a bayonet joint, establishing a reliable connection between the two parts. This bayonet lock comprises a pin 25 constantly urged outwardly by means of a spring 38 which engages the end portion of part 4, so that the bayonet lock will constantly connect adjusting screw 4 with the differential screw 3 in a manner which permits no freedom or play in an axial direction.

The required fixation of adjusting rod 2 rotationally with respect to boring bar 1 is effected by means of screw 9 engaging in one of a plurality of grooves 2a or 2b–d, respectively, in the adjusting rod 2.

The degree of mechanical advantage provided by the toggle depends on the angle between the axes of the arms 10 and 10'. If the angle in relation to 180° is small, ratio movement of feed screw to movement of boring bit (the mechanical advantage) is small; if on the other hand, the toggle lever is spread to its almost fully extended position so that the angle between the levers approaches 180° the reduction of the feed path will be large. The mechanical advantage will therefore be altered according to the respective position of the toggle lever. This setting can be altered by altering the choice of slot 2a to 2d in which screw 9 engages, the adjusting rod 2 being rotated by screw-driven slot 2' for this purpose, and the screw 16 being also adjusted.

As shown in FIGURE 3, the boring bit 11 is clamped in its radial location inside boring bar 1 by means of a screw 22 so that the boring bit cannot fly out of the boring bar as the result of centrifugal forces. Screw 22 presses on boring bit 11 and the forward feed of boring bit 11 can be effected by means of the toggle mechanism notwithstanding the pressure exerted by screw 22 which is allowed to remain in force. Screw 22 serves also to maintain boring bit 11 properly orientated so that the cutting edge is presented always at the correct angle to the work piece being machined.

As already stated, the reduction ratio of the toggle lever depends on the degree of its spread. To permit feeding of boring bit 11 by a definite known amount a certain reduction ratio must be selected so that a prescribed rotation of differential nut 3 will cause the required forward feed movement of the tool bit 11.

In theory, due to the action of the toggle mechanism, this feed relationship cannot be constant in value, but since the wear of the tool bit occasioned by the machining of even large numbers of work pieces is only slight, the toggle lever requires only an extremely small forward feed. Because of the smallness of this change in the spread of the toggle lever the ratio can be considered as being constant over the practical range of adjustment. Moreover, only a limited amount of wear of any tool bit can be tolerated due to the fact that it will no longer cut efficiently when worn; when this stage is reached it must be removed and resharpened, at which time the feed screw 2 can be reset to its original position so as to maintain the required ratio, compensation for the amount both worn and sharpened off the tool being achieved by adjusting screw 16.

By means of the various slots 2a–2d the spread of the toggle lever may be selected in such a manner that the required reduction ratio of the toggle lever will be established.

The required minute feed of the boring bit results in two advantages when using a differential screw instead of a conventional screw provided with a fine thread. Firstly, the two threads may be coarse threads and will therefore cope much better with the heavy forces involved in rapid mass production and, secondly, it will take a relatively large rotation of the differential screw 3 (for example by 10° or more) to effect the required small movement of the tool bit. Thus the need for precision in the control of the amount of rotation of the differential screw is reduced.

Pin 12 in front of the toggle lever is under the influence of spring 13 which forces pin 12 constantly against the toggle lever, so that the latter is constantly forced into contact with the end face of feed screw 2; this is of assistance when changing or adjusting tools manually.

The adjusting spindle 4 may be operated to effect adjustment in any desired manner, for example by a rotary solenoid which is coupled to the adjusting shaft by means of an electro-magnetic clutch when the boring spindle is stopped. Release of the clutch will permit the rotary solenoid to reset so that, if required, it may act through the clutch to cause further incremental rotation of the adjusting shaft 4, and this may be repeated a number of times as necessary. Adjusting screw 4 is enclosed in a Morse taper shank 5, in which the adjusting screw is mounted by means of bushing 6. A cap 7 with a nut 8 are adapted to suit the boring bar clamping means provided on the boring spindle (shown in chain line FIGURE 1). The boring spindle is further equipped with a roughing bit 21 in advance of the tool 11 which is set to the required position by means of set screw 14. FIGURE 2 shows that spring loaded pin 12 is locked against rotation by means of a special dog screw 15. FIGURE 3 shows that roller 24, the central joint of the toggle lever, is locked against movement in axial direction by two spacing screws 17. The tip of the boring bar is designated by 18.

FIGURE 5 shows how the adjusting shaft 4 may be rotated relatively to machine spindle 26 which carries boring bar 1.

The machine spindle 26 is driven by motor 27 and gear wheels 28, 29. Housing 30 is secured on the machine spindle 26, and the spindle is supported in bearing 31 from the machine frame 31'. The housing 30 is entered by adjusting spindle 4 and also by a shaft 32. The housing is frictionally connected with shaft 32 by brake disk 34 under the effect of spring 33. To facilitate rotation of shaft 32 in relation to spring 33 a thrust bearing 35 is provided. Because of this frictional connection shaft 32, under the influence of brake disk 34, will normally rotate at the same speed as housing 30 and spindle 26.

Connection of spindle 4 to shaft 32 by pin 36 or slot 37' permits the spindle 4 and shaft to move freely relatively to one another axially while coupling them for rotation. This is required on account of the axial movement of differential screw 3 resulting from its rotation, which movement will also be transmitted to shaft 4 which is coupled to the screw: due to slot 37' cooperating with pin 36, this axial movement will not be transmitted to shaft 32. To keep adjusting shaft 4 positively connected through the pin 25 of the bayonet lock to differential screw 3, spring 38 acts through thrust bearing 39 on the collar 4' of adjusting shaft 4. Drive of shaft 32 relatively to spindle 26 for adjustment is effected by axial movement of an adjusting motor 40, preferably a geared motor, which is moved in an axial direction by means of piston 41 in cylinder 42 through piston rod 43 so as to engage clutch members 44 and 45. Instead of the cone clutch shown in the drawing any known type of disconnectable coupling may be used.

When motor 40 is moved forwards in an axial direction part 45 of the cone clutch will contact clutch part 44 and will in the course of further forward movement slide shaft 32 in an axial direction in such a manner that the connection between housing 30 and brake disk 34 is interrupted. This will generally be done when the machine spindle 26 has been stopped. The interruption of positive connection between housing 30 and brake disk 34 may also be effected by other means, for example by means of electromagnetic clutches.

Another embodiment according to FIGURE 5 makes no use of the adjusting motor 40, piston rod 43 being directly connected with coupling end 45: in this case shaft 43 is provided with a locking means to keep shaft 43 from rotating about its axis, only longitudinal movements being possible. When using this method, the adjusting of the tool bit is effected by causing engagement of the clutch members 44 and 45 for a specified period of time whilst the spindle 26 is still being rotated by motor 27, so that adjusting spindle 4 rotates relatively to machine spindle 26 during the adjusting operation for the period necessary to give the required amount of feed. Proper selection of the aligning speed and period of time of clutch engagement determine the relative angle of rotation of shaft 4, which gives accurate adjustment of the boring bit 11. Between the coupling flange 44 and the adjusting shaft 4 a reduction gear train may be interposed to facilitate the imposition of very small increments of feed to the tool bit thereby enhancing the accuracy.

For the return motion of adjusting rod 2, necessary when replacing the tool bit or setting for a different basic diameter of bore in the work piece, spindle 26 may be reversed while the clutch is engaged.

If the boring bit is worn down and requires replacement feed screw 2 is put back into its starting position by rotating differential screw 3. In the first named embodiment according to FIGURE 5, that is with adjusting motor 40, motor 40 will be rotated in a direction opposite to that used when adjusting the tool bit for wear. In the embodiment without adjusting motor, machine spindle 26 will rotate in a direction contrary to normal for the purpose of returning feed screw 2.

Another embodiment of feeding device is shown in FIGURE 6. This device for operating the spindle 4 facilitates adjustment whilst a work piece is being machined by the boring bit 11. By it, it is possible to adjust boring bit 11 continuously during a machining operation in order to compensate for wear encountered during the boring operation. Thus in long bores, taper produced due to tool wear may be eliminated and in spite of wear of the boring bit 11 the bore may have the same accurate diameter along its entire length.

The machine spindle 26 carries a bevel gear wheel 46 which, by means of bevel gear 47 and lay shaft 48 and gears 48', 48" transmits the rotary movement of the machine spindle to a differential gear box 49. The means of rotating the spindle 26 is not shown, but may be by any system of drive commonly employed on such machines. This differential gear box is also connected to a variable-speed adjusting motor 50 which is also reversible in its direction of rotation. In addition, spindle 4 is connected with the differential gear box 49 through gear box 51 which is mounted upon and rotates with the machine spindle 26. The gear box 54 contains a gear 54 mounted on spindle 4 which meshes with a gear on a lay shaft 55 and this is connected by gear 56 to a gear on spindle 57 coaxial with spindle 4. A counter weight 51' balances the gear box and spindle 57 carries a bevel gear 53 above this box. The transmission ratios between the input gear wheel 53 and the gear wheel 46 are now selected in such a manner that when the adjusting motor 50 is not rotating the input gear wheel 53 is driven at the same speed and in the same direction as gear wheel 46. Accordingly when machine spindle 26 rotates and adjusting motor 50 is stopped, feed screw 4 will rotate at the same speed as machine spindle 26. In this case the adjustment of boring bit 11 (FIGURE 1) is not altered. Stopping of adjusting motor 50 may if necessary be ensured by means of a brake (not shown) which can be released if rotation of the adjusting motor is required and which is suitably mounted on the motor.

If on the other hand, the adjusting motor 50 is rotated, adjusting spindle 4 is turned relative to machine spindle 26, independently of the rotation of machine spindle 26.

The device shown in FIGURE 6 therefore permits adjustment of boring bit 11 at any time, including adjustment in the course of a machining operation. This permits continuous correction of any dimensional errors on the work caused by wear of the boring bit. Any taper or conicity appearing during the boring operation may thus be corrected.

In addition, as is the case with the feeding device according to FIGURE 5, an extremely sensitive adjustment of the boring bit is possible.

The rate of feed in the direction of the rotational axis of the boring bar during precision machining is, as is well known, a major controlling factor of the duration of the machining operation. Therefore this feed is selected to be as large as possible, consistent with producing a satisfactory surface finish and an amount of tool point wear which is tolerable in relation to the degree of conicity or size variation permitted in the finished work piece. This compels the operator to limit the feed to some value below the maximum. In order to increase feed substantially, however, boring bars have been constructed which use several boring bits.

The arrangement described in the present invention may be set up in such a manner that several boring bits are mounted on one boring bar which may be adjusted by means of adjustment mechanism according to the present invention either together or independently of each other.

It should be noted that the adjusting mechanism according to the present invention and its various embodiments are universally applicable. In particular, the boring bar according to FIGURE 1 may be used for boring and by moving its axis of rotation parallel to but away from the axis shown in FIGURE 1, also for outside turning.

It is possible, instead of causing the boring bit to rotate, to rotate the work pieces. Such an embodiment of the feeding device in accordance with the present invention is especially suitable for adjusting and feeding tools on automatic machines.

FIGURE 7 is an operating diagram which indicates in which manner the boring bit 11 may be adjusted in the event that the said boring bit is worn down and the rated or required dimensions of work piece K are no longer attained. Boring bar 1 carries boring bit 21 which serves for rough boring, and boring bit 11 which attends to the finish boring as already described. The bore made in work piece K is gauged by a measuring head 60 as to its exact diameter by means of a pair of measuring caliper arms 61. The measuring head 60 is connected, in known manner, electrically or pneumatically with a secondary gauge 62. This secondary gauge may indicate work piece dimensions visibly but its primary function is to determine whether the dimension of the bore in work piece K conforms to the rated dimension. If the dimension of the bore does not meet the rated dimension one or several impulses are electrically transmitted to a control unit 63. The control unit, in accordance with the signals received from the gauge 62 transmits automatically (electrically, hydraulically, pneumatically, or otherwise), correction signals to machine spindle 26 and adjusting head 64 such as to cause correction of the tool by an amount corresponding to the deviation measured. The adjusting head 64 may preferably be constructed in accordance with FIGURE 5 or 6. The calipers 61 may be used to measure the bore either continuously while the work piece K is being machined by boring bit 11 (by causing them to follow the boring bit) or to measure the bore after machining of the work piece K has been completed. In order to permit accurate measurements, chips are blown away from the measuring calipers 61 and from the walls of the bore by means of compressed air in known manner.

In the event that the dimension of the bore as determined by the calipers 61, measuring unit 60 and measuring gauge 62, differs by more than a predetermined amount from the proper size the control unit 63 may be used either to report this excess directly to the adjustment controls of machine spindle 26 of the machine itself, as already described, or to an entire production line in which the machine according to FIGURE 7 is employed. An acoustic or optical warning signal may also be given to the machine operator who can then check boring bit 11 and will replace it, if necessary.

As shown in FIGURE 7 boring bar 1 is designed in such a manner that it has a smaller diameter at its operating end and a larger diameter above. This design of the boring bar is required whenever the bore of the work piece K is small. In such a case it is very difficult to design the differential screw 3 and screw 9 used for adjustments of the reduction, according to FIGURE 1, sufficiently small to fit into a bar of dimensions limited by the bore of work piece K. For this reason these parts are in that part of the boring spindle which has the larger diameter. Accordingly the adjustment rod 2 (FIGURE 1) is somewhat extended so that it extends the larger portion of boring bar 1 into the slimmer portions and actuates the toggle lever in that section of boring bar 1 which has the smaller diameter.

We claim:

1. A cutting-tool holder comprising in combination a body, an aperture in the body opening to the side thereof, means for supporting a tool bit in said aperture so that the bit projects from the body, a toggle comprising a pair of toggle members in said aperture and having their adjacent ends hinged together, the outer end of one of said toggle members being in engagement with the inner end of the tool bit, the said aperture containing a seating for the outer end of the other of said toggle member, yieldable means urging the toggle members toward a bent position, means in the body engaging the hinged together ends of said toggle members operable to adjust the toggle toward a straightened out position to advance the tool bit outwardly in the body, and means continuously firmly holding the tool bit in the said aperture against lateral movement therein.

2. A cutting-tool holder as set forth in claim 1 wherein the body of the holder is formed as a boring bar, and the said aperture therein is transverse to the length of the said bar.

3. A cutting-tool holder as set forth in claim 2 wherein the means to adjust the toggle to advance the tool-bit outwardly comprises an adjusting rod extending longitudinally through the boring bar, one end of said rod bearing on the hinged together ends of the toggle members, and means carried by the boring bar at the other end of said adjusting rod for urging the rod toward the said toggle.

4. A cutting-tool holder as set forth in claim 2 wherein the means to adjust the toggle to advance the tool-bit outwardly comprises an adjusting rod extending longitudinally through the boring bar, one end of said rod bearing on the hinged together ends of the toggle members, and means carried by the boring bar at the other end of said adjusting rod for urging the rod toward the said toggle, said yieldable means urging the toggle members toward a bent position comprising a spring in the boring bar arranged on the opposite side of the hinge of the toggle from said adjusting rod.

5. A cutting-tool holder as set forth in claim 2 wherein the means to adjust the toggle to advance the tool-bit outwardly comprises an adjusting rod extending longitudinally through the boring bar, one end of said rod bearing on the hinged together ends of the toggle members, and means carried by the boring bar at the other end of said adjusting rod for urging the rod toward the said toggle, said adjusting rod comprising a screw threaded member within the boring bar and having screw threaded engagement therewith, said screw threaded member being co-axial with said adjusting rod.

6. A cutting-tool holder as set forth in claim 2 wherein the means to adjust the toggle to advance the tool-bit outwardly comprises an adjusting rod extending longitudinally through the boring bar, one end of said rod bearing on the hinged together ends of the toggle members, and means carried by the boring bar at the other end of said adjusting rod for urging the rod toward the said toggle, said adjusting rod comprising a screw threaded member within the boring bar and having screw threaded engagement therewith, said screw threaded member engaging the adjusting rod by means of a screw thread, said screw thread being of a different pitch from the screw threaded engagement of the said threaded member with the boring bar.

7. A cutting-tool holder as set forth in claim 2 wherein the means to adjust the toggle to advance the tool bit outwardly comprises an adjustment rod extending longitudinally through the boring bar, one end of said rod bearing on the hinged together ends of the toggle members, and means carried by the boring bar at the other end of said adjusting rod for urging the rod toward the said toggle, said adjusting rod comprising a screw threaded member within the boring bar and having screw threaded engagement therewith, said screw threaded member being co-axial with said adjusting rod, said screw threaded member engaging the adjusting rod by means of a screw thread, said screw thread being of a different pitch from the screw threaded engagement of the said threaded member with the boring bar, a driving spindle connected to said screw threaded member and extending through said boring bar, and a motor connected to said driving spindle for driving it in rotation relative to said boring bar.

8. A boring-tool comprising in combination a boring bar having a transverse bit-holder aperture therein to receive a tool-bit, means for holding a tool-bit firmly in place in said aperture, a seating at one end of said aperture, a pair of toggle links hingeably engaged with one another wtihin said aperture, one bearing against said seating and the other positioned to bear against a toolbit in the aperture, yielding means on one side of said aperture to urge the toggle-links to a bent position, an adjusting-rod slidable longitudinally in the boring-bar to adjust the toggle-links toward a straightened position, and screw-means for moving said rod.

9. A boring tool as claimed in claim 8 wherein the screw-means comprise a screw coaxial with the adjusting rod and engaged with a screw thread in the boring bar, said screw also having a separately screwed portion of different pitch engaged with a screw thread on the adjusting rod.

10. A boring tool as claimed in claim 9 wherein the adjusting rod is adjustable rotatably relatively to the bar, means on the bar engageable with said rod for holding said rod against rotation in adjusted position, so that the initial angle of the toggle-links to each other can be varied.

11. A boring tool as claimed in claim 8 wherein the screw means is driven by a driving spindle which extends through the bar to one end thereof.

12. A boring tool as claimed in claim 11 wherein the driving spindle is connected to a clutch and the clutch to an operating motor.

13. A boring tool as claimed in claim 11 wherein the driving spindle and the boring bar are each connected to two members of a three-member differential gear, the gearing being of such ratios that if the third member is held at rest the driving spindle and boring bar will rotate together at the same speed, and means are provided to operate the third member of the differential to actuate the toggle and adjust the tool.

14. A boring tool as claimed in claim 8 wherein the seating for the toggle, within the bit-holder aperture, is adjustable.

References Cited in the file of this patent
UNITED STATES PATENTS 2,273,228    Smith _____ Feb. 17, 1942

OTHER REFERENCES

Calow: German application, 1,017,880, printed October 17, 1957, (kl 492 2/03).